3,505,395
NOVEL ALKYLARYLSULFONATES
Claude H. Trottier, Lincoln, R.I., and Louis Long, Jr.,
Concord, Mass., assignors to the United States of America as represented by the Secretary of the Army
No Drawing. Filed Oct. 13, 1966, Ser. No. 587,383
Int. Cl. C07c 143/38; C11d 3/065
U.S. Cl. 260—505      3 Claims

ABSTRACT OF THE DISCLOSURE

Novel sulfonyl, sulfinyl, monothia and dithia substituted alkylarylsulfonates useful as water soluble surface active agents.

---

This invention relates to a novel class of alkylarylsulfonate compounds wherein at least one of the methylene groups of the alkyl chain is replaced by sulfur or an oxide of sulfur.

The novel compounds of this invention have the following formula:

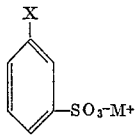

wherein M is a cation; and
X is a member of the group consisting of

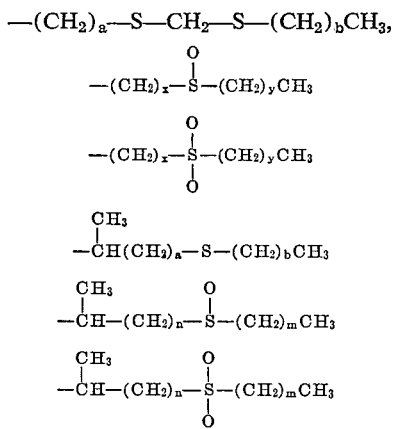

with $a$ being a whole integer from 1 to 8 and $b$ being a whole integer from 0 to 7, with the sum of $a$ and $b$ being 8; with $n$ and $m$ being whole integers from 0 to 8, with the sum of $n$ and $m$ being 8; with $x$ and $y$ being whole integers from 0 to 10, with the sum of $x$ and $y$ being 10.

The novel compounds of this invention are surface active agents, and have excellent detersive properties comparable to n-dodecylbenzenesulfonate. While M in the formula above may be any cation, because these compounds are useful as surfactants, it is preferred that the cation be one which will cause the compound to be readily soluble in water such as members of the class consisting of alkali metals, alkaline earth metals, ammonium, and alkanolamines, e.g. sodium, potassium, magnesium, and mono-, di- and tri-ethanolamine.

The preparation of these novel compounds will be described in detail in the examples which follow.

A

Salts of dithia-substituted alkylbenzenesulfonates having the formula

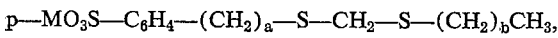

wherein M, $a$ and $b$ have the same meaning as recited above, are synthesized by reacting an n-alkylthiomethylmercaptan with the salt of a para-substituted haloalkylbenzenesulfonate. This synthesis is illustrated by the following example.

EXAMPLE I

Sodium p-(4,6-dithia-n-dodecyl)benzenesulfonate.—To a mixture of 0.14 g. of sodium in 7 ml. of ethanol there was added 10 ml. of dimethylformamide (DMF) and the mixture stirred for 15 minutes. To this mixture there was added under nitrogen 1.0 g. of n-hexylthiomethylmercaptan in 10 ml. of DMF and the mixture stirred for another 15 minutes. A mixture of 1.8 g. of sodium p-(3-bromopropyl)-benzenesulfonate in 30 ml. of DMF was added to the above mixture under nitrogen and allowed to stand for 12 hours. The mixture was cooled, filtered and the filtrate concentrated under vacuum until a precipitate formed. The precipitate in the concentrated filtrate was filtered, and the crude product was recrystallized from ethanol to give 1.0 g.. (44% yield) of sodium p-(4,6-dithia-n-dodecyl) benzenesulfonate.

The structure of this compound is established by elemental analysis and nuclear magnetic resonance (NMR).

Analysis.—Calc'd. for $C_{16}H_{25}S_3O_3Na$ (percent): C, 49.98; H, 6.54; S, 25.02. Found (percent): C, 49.94; H, 6.72; S, 25.12.

The nuclear magnetic resonance exhibited an $A_2B_2$ pattern for the aromatic protons indicative of a para-substituted phenyl group. The coupling constant was 8 cps. The methylene group between the two sulfur atoms appeared as a singlet. The benzyl group and the methylene groups adjacent to the sulfur appeared as a multiplet. The intensities found were the same as the calculated values.

The tau value intensities and assignments of the NMR signals for this compound are as follows:

Spectra:
    Aromatic 2.27, H 2.87
    —S—CH$_2$—S— 6.28
    PhCH$_2$— and CH$_2$S— 7.4
    —CH$_2$— 8.55
    CH$_3$ 9.01
Intensities _____2:2:2:6:10:3

B

Salts of sulfinyl substituted alkylbenzenesulfonates are formed by reacting a p-(thia-n-dodecyl) benzenesulfonate with an aqueous solution of a sodium metaperiodate. The preparation of p-(thia-n-dodecyl) benzenesulfonates is disclosed in a copending application of Dietrich Lang and Louis Long, Jr., Ser. No. 408,703, filed Nov. 3, 1964 and now U. S. Patent No. 3,344,173, the disclosure of which is incorporated herein by reference.

EXAMPLE II

Sodium-p - (1 - sulfinyl-n-dodecyl)benzenesulfonate.—
Sodium p-(1-thia-n-dodecyl) benzenesulfonate is prepared as follows: Sodium (11.5 g., 0.50 mole) was dissolved in 250 ml. of absolute ethanol and 55 g. of thiophenol (0.50 mole) was added. Under external cooling, 95 g. of n-undecyl chloride (0.50 mole) was added and then the reaction mixture was boiled under reflux for 3.5 hrs. The precipitated sodium chloride was filtered, the solvent evaporated, and the residue dissolved in a mixture of petroleum ether and benzene from which the phenyl n-undecyl sulfide crystallized on cooling.

A solution of 20 g. (0.08 mole) of phenyl n-undecyl sulfide in 10 ml. of chloroform was dropped during 1 hr. into 30 ml. (0.45 mole) of chlorosulfonic acid with stirring at 25° C. The reaction mixture was then poured on ice and the organic material extracted with ether. The ether solution was washed with water, sodium bicarbonate solution, again with water, and dried. Evaporation of the solvent yielded 18 g. (0.05 mole, 65%) of crude p-(1-thia-n-dodecyl) benzenesulfonyl chloride. Its infrared spectrum showed the typical absorption bands for the sulfonyl chloride group at 1175 and 1370 cm.$^{-1}$. In 150 ml. of 60% ethanol, 4.0 g. (0.10 mole) sodium hydroxide and 18 g. (0.05 mole) of the sulfonyl chloride were dissolved, and the mixture was stirred for several hours at room temperature. On cooling the solution in an ice-bath, sodium p - (1 - thia-n-dodecyl) benzenesulfonate crystallized in colorless leaflets. After three recrystallizations from 50% ethanol, 12 g. (0.03 mole, 65%) was obtained.

To 2.14 g. of sodium metaperiodate (0.0105 mole) in 25 ml. of water was added 3.66 g. (0.01 mole) sodium p-(1-thia-n-dodecyl) benzenesulfonate at 0° to 5° C. The mixture was stirred for 48 hours, filtered and the residue washed with ethanol. The filtrate and washings were concentrated and cooled and the resulting precipitate was collected on a filter. The sodium p-(1sulfinyl-n-dodecyl) benzenesulfonate was obtained in 90% yield. An infrared spectrum of this compound showed the typical absorption band for the sulfoxide (S—O) at 1030 cm.$^{-1}$. The elemental analysis and NMR spectra for this compound and the sulfinyl compounds obtained in Examples III and IV will be found in Tables I and II respectively.

EXAMPLE III

Sodium p-(2 - sulfinyl-n-dodecyl) benzensulfonate.— Sodium p-(2-thia-n-dodecyl) benzenesulfonate was prepared as follows: Sodium p-toluenesulfonate (68 g., 0.35 mole) was placed in a 500–ml., four-necked flask provided with a mechanical stirrer, a thermometer and a gas-inlet and outlet. The flask was immersed in an oil-bath at 120° C., and, with stirring of the dry salt, chlorine was passed in. The internal temperature rose to 145° C. After 75 min. the reactant had gained 11 g. The crude reaction product was twice recrystallized from 90% ethanol. The analysis as well as the nuclear magnetic resonance (NMR) spectrum indicated that this product was a mixture of mono- and dichlorinated toluenesulfonate. Its NMR spectrum in deuterated water (TMS as an external standard) showed, beside the signals for the phenyl protons around tau 2.4 and the singlet for the benzyl protons at tau 5.37, another singlet at tau 3.04 due to the benzol proton. From the intensities of these signals the proportion of the compounds was calculated to be about 60% alpha-monochloro- and 40% alpha-dichlorotoluenesulfonate.

To a solution of 26 g. of this mixture (about 0.10 mole) and 6.0 g. (0.15 mole) of sodium hydroxide, 400 ml. of 40% ethanol and 26 g. (0.15 mole) of n-decanethiol were added, and the reaction mixture was boiled under reflux for 2 hrs. After neutralization with hydrochloric acid, the solution was cooled, and the precipitated colorless leaflets of sodium p(2-thia-n-dodecyl)-benzenesulfonate were recrystallized three times from 50% ethanol.

Sodium metaperiodate, 214 g. (0.01 mole), in 25 ml. of water was added to 0.01 mole (3.66 g.) of sodium p-(2-thia-n-dodecyl) benzenesulfonate at a temperature of 0° C. This mixture was stirred for 48 hours, filtered and the residue washed with ethanol. The filtrate and washings were concentrated and cooled. Upon cooling a precipitate formed which was then collected on a filter. Sodium p-(1-sulfinyl-n-dodecyl) benzenesulfonate was obtained in 80% yield. Infrared spectrum showed the typical absorption band for the sulfoxide at 1030 cm.$^{-1}$.

EXAMPLE IV

Sodium p-(N-sulfinyl-n-dodecyl) benzenesulfonate.— N is 3 to 11 inclusive. The sodium salts of p-(N-thia-n-dodecyl) benzenesulfonate, where N is 3 to 11 were obtained by the following general procedure. The chloroalkyl-benzene (1.0 mole) was added dropwise during 1.5 hrs. to chlorosulfonic acid (10.0 moles) with efficient stirring, and external cooling by a water-bath at temperatures between 0° and 25° C. The reaction mixture was stirred for another hour and then poured onto ice. The aqueous mixture was extracted with ether, the ether layer was separated from the water layer, and the ether removed by evaporation in vacuum. The residue was purified by distillation under reduced pressure.

The purified chloroalkylbenzenesulfonyl chloride (1.0 mole) was added to a solution of sodium hydroxide (2.0 moles) in water (5.9 ml. of water per gram of sodium hydroxide), and the heterogeneous reaction mixture was stirred vigorously until it became homogeneous. The solution was neutralized with hydrochloric acid and evaporated to dryness. Recrystallization of the residue from ethanol yielded crystalline sodium p-(chloroalkyl) benzenesulfonate.

A mixture of equimolecular quantities of sodium p-(chloroalkyl)-benzenesulfonate, sodium hydroxide and n-alkylmercaptan was boiled under reflux for 3 hrs. On cooling the solution, the desired product crystallized. Recrystallization from water, or aqueous ethanol, afforded pure crystalline sodium p-(N-thia-n-dodecyl)-benzenesulfonate.

Sodium p-(N-thia-n-dodecyl) benzenesulfonate compound (0.01 mole), N being any integer from 3 to 11 inclusive, was added to 0.01 mole of sodium metaperiodate in 25 ml. of water at 0° C. The mixture was stirred for 48 hours, filtered, and the residue washed with ethanol. Filtrate and washings were concentrated. On cooling, a precipitate formed, which was collected on a filter. The infrared spectrum of each of the compounds in this series showed the characteristic sulfoxide band at 1030 cm.$^{-1}$.

TABLE I

Elemental analysis of sodium p-(Sulfinyl-n-dodecyl) benzenesulfonates

| Sodium p-(sulfinyl-n-dodecyl) benzenesulfonate | Carbon, percent (Calc. 53.37) Found | Hydrogen, percent (Calc. 7.11) Found | Sulfur, percent (Calc. 16.76) Found |
| --- | --- | --- | --- |
| 1-sulfinyl | 53.19 | 7.00 | 16.74 |
| 2-sulfinyl | 52.23 | 7.13 | 16.48 |
| 3-sulfinyl | 53.20 | 7.05 | 16.66 |
| 4-sulfinyl | 53.08 | 6.91 | 16.73 |
| 5-sulfinyl | 53.18 | 7.23 | 16.54 |
| 6-sulfinyl | 53.60 | 7.12 | 16.65 |
| 7-sulfinyl | 53.08 | 7.00 | 16.57 |
| 8-sulfinyl | 53.60 | 7.12 | 16.56 |
| 9-sulfinyl | 53.18 | 7.07 | 16.78 |
| 10-sulfinyl | 53.50 | 7.15 | 16.59 |
| 11-sulfinyl | 53.40 | 6.97 | 16.61 |

TABLE II

NMR spectra of sodium p-(sulfinyl-n-dodecyl) benzenesulfonates

| Compound | Aromatic | H | —CH$_2$S— and | PhCH$_2$- | —CH$_2$- | —CH$_3$ | Intensities |
| --- | --- | --- | --- | --- | --- | --- | --- |
| 1-sulfinyl | 2.10 | | 6.88 | | | 8.74 | 9.14 | 2:2:2:18:3 |
| 2-sulfinyl | 2.15 | 2.50 | 5.77 | 6.98 | 8.74 | 9.14 | 2:2:2:2:16:3 |
| 3-sulfinyl | 2.25 | 2.68 | 6.98 | | 8.74 | 9.14 | 2:2:6:14:3 |
| 4-sulfinyl | 2.25 | 2.70 | 7.25 | | 8.74 | 9.13 | 2:2:6:14:3 |
| 5-sulfinyl | 2.23 | 2.73 | 7.26 | | 8.72 | 9.11 | 2:2:6:14:3 |
| 6-sulfinyl | 2.25 | 2.73 | 7.25 | | 8.51 | 9.15 | 2:2:6:14:3 |
| 7-sulfinyl | 2.25 | 2.72 | 7.26 | 7.38 | 8.62 | 9.13 | 2:2:4:1:24:3 |
| 8-sulfinyl | 2.20 | 2.75 | 7.25 | | 8.68 | 9.10 | 2:2:6:14:3 |
| 9-sulfinyl | 2.25 | 2.73 | 7.30 | 7.41 | 8.79 | 9.01 | 2:2:4:2:14:3 |
| 10-sulfinyl | 2.22 | 2.76 | 7.35 | | 8.72 | 9.03 | 2:2:6:14:3 |
| 11-sulfinyl | 2.22 | 2.75 | 7.22 | 7.44 | 8.75 | 7.44 | 2:2:2:2:16:3 |

A general feature of all spectra of Table II is an $A_2 B_2$ pattern with two doublets of equal intensity for the phenyl protons. The coupling constants ($J_{AB}=8$ cps.) are the same in all cases. The $A_2 B_2$ pattern found for the phenyl protons is characteristic of substituents in a benzene ring in the para positions. In some cases, the peaks for the benzyl protons and the protons of the methylene groups that are next to the sulfoxide group are not separated but rather consist of a multiplet. The observed intensities are in all cases identical with the calculated values.

C

The salts of sulfonyl alkylbenzenesulfonates are formed by reacting a p-(thia-n-dodecyl) benzene sulfonate with ozone as illustrated in Example V.

EXAMPLE V

Sodium p-(N-sulfonyl-n-dodecyl) benzenesulfonates.— N being 1 to 11 inclusive. The eleven isomers of sodium p-(N-sulfonyl-n-dodecyl) benzene sulfonate wherein the sulfonyl group is located in any one of the 1 through 11 position of the alkyl chain are prepared by the following general procedure wherein 0.1 mole of sodium p-(N-thia-n-dodecyl) benzenesulfonate is added to 250 ml. of methylene chloride and 100 ml. of methanol and the solution (placed in a flask fitted with a fritted cylindrical tube. Ozone gas was passed through the tube for four hours. The solvent was concentrated in vacuo and the precipitate recovered by filtration. The sulfone was recrystallized from ethanol-water to quantitative yield. The infrared spectrum of each of the eleven isomers thus prepared showed the presence of the sulfone bands at 1310 and 1130 cm.$^{-1}$. The elemental analysis and NMR spectra for the eleven isomers thus prepared are set forth in Tables III and IV respectively.

TABLE III

Elemental analysis of sodium p-(sulfonyl-n-dodecyl) benzenesulfonates

| Sodium p-(sulfonyl-n-dodecyl) benzenesulfonate | Carbon, percent (Calcd. 51.23) Found | Hydrogen, percent (Calcd. 6.83) Found | Sulfur, percent (Calcd. 16.10) Found |
|---|---|---|---|
| 1-sulfonyl | 51.40 | 6.78 | 16.13 |
| 2-sulfonyl | 51.60 | 6.95 | 15.95 |
| 3-sulfonyl | 51.40 | 6.77 | 15.90 |
| 4-sulfonyl | 51.25 | 6.72 | 16.13 |
| 5-sulfonyl | 51.30 | 6.68 | 16.32 |
| 6-sulfonyl | 51.23 | 6.70 | 16.11 |
| 7-sulfonyl | 51.40 | 6.60 | 16.25 |
| 8-sulfonyl | 51.30 | 6.60 | 15.87 |
| 9-sulfonyl | 51.22 | 6.83 | 15.98 |
| 10-sulfonyl | 51.00 | 6.67 | 16.29 |
| 11-sulfonyl | 51.11 | 6.82 | 16.05 |

TABLE IV

NMR spectra of sodium p-(sulfonyl-n-dodecyl) benzenesulfonates

| Compound | Aromatic | H | —CH$_2$S— | and | PhCH$_2$— | —CH$_2$— | —CH$_3$ | Intensities |
|---|---|---|---|---|---|---|---|---|
| 1-sulfonyl | 2.05 | | | 6.78 | | 8.72 | 9.12 | 2:2:2:18:3 |
| 2-sulfonyl | 2.17 | 2.57 | 5.67 | | 6.95 | 8.70 | 9.12 | 2:2:4:2:14:3 |
| 3-sulfonyl | 2.27 | 2.72 | 6.85 | | 6.97 | 8.70 | 9.12 | 2:2:4:2:14:3 |
| 4-sulfonyl | 2.25 | 2.75 | 6.97 | | 7.25 | 8.72 | 9.12 | 2:2:4:2:14:3 |
| 5-sulfonyl | 2.27 | 2.73 | 6.94 | | 7.37 | 8.72 | 9.12 | 2:2:4:2:14:3 |
| 6-sulfonyl | 2.27 | 2.73 | 6.97 | | 7.40 | 8.60 | 9.13 | 2:2:4:2:14:3 |
| 7-sulfonyl | 2.35 | 2.72 | 7.05 | | 7.42 | 8.62 | 9.15 | 2:2:4:2:14:3 |
| 8-sulfonyl | 2.27 | 2.75 | 6.95 | | 7.38 | 8.65 | 9.12 | 2:2:4:2:14:3 |
| 9-sulfonyl | 2.27 | 2.72 | 7.02 | | 7.47 | 8.72 | 9.01 | 2:2:4:2:14:3 |
| 10-sulfonyl | 2.25 | 2.74 | 7.00 | | 7.45 | 8.74 | 8.88 | 2:2:4:2:14:3 |
| 11-sulfonyl | 2.24 | 2.73 | 7.05 | | 7.38 | 8.73 | 7.05 | 2:2:2:2:16:3 |

The $A_2 B_2$ pattern characteristic of a para-substituted benzene ring is evident in Table IV. The coupling constants ($J_{AB}=8$ cps.) is the same as for the aromatic phenyl protons. The peaks for the benzyl protons and methylene group next to the sulfone are separated in all cases except for the 1-substituted sulfone. The observed intensities are in all cases identical with the calculated values.

D

The salts of isomers of p-(1-methyl-N-thia-n-undecyl) benzenesulfonate where N is 3 to 10 inclusive can be synthesized by reacting an n-alkylmercaptan with the salt of a para-substituted haloalkylbenzenesulfonate.

EXAMPLE VI

Sodium p-(1-methyl-5-thia-n-undecyl) benzenesulfonate.—To 0.01 mole of sodium p-(1-methyl-4-bromopropyl) benzenesulfonate in 150 ml. of ethanol-water was added 0.01 mole of n-hexylmercaptan and 0.02 mole of sodium hydroxide in 50 ml. of water. The reaction mixture was refluxed for four hours, cooled, filtered and the residue recrystallized from ethanol-water to give sodium p-(1-methyl-5-thia-n-undecyl) benzenesulfonate. The structure of this compound was established by elemental analysis; NMR and infrared spectra. The tau value, intensities, and assignments of the NMR signals of the compound are as follows:

Aromatic _____ 2.24
H _____ 2.82
—CH— _____ 6.34
—CH$_2$S— _____ 7.57
—CH$_2$— and —CH—CH$_3$ _____ 8.62
—CH$_3$ _____ 8.95
Intensities _____ 2:2:1:4:15:3

The NMR spectrum shows the $A_2 B_2$ pattern for the phenylprotons indicative of a para-substituted benzene ring, having a coupling constant ($J_{AB}$) of 8 cps. The methyl group attached to the methine proton and the methylene groups are not separated and appear as a multiplet. The observed intensities are identical with the calculated values.

*Elemental analysis.*—Calcd. (percent): C, 55.71; H, 7.43; S, 17.50. Found (percent): C, 55.70; H, 7.40; S, 17.33.

The synthesis of other isomers in this series can be accomplished by the same procedure as set forth in Example VI.

EXAMPLE VII

Sodium p-(1-methyl-5-sulfinyl-n-undecyl) benzenesulfonate.—To 0.01 mole of sodium metaperiodate in 25 ml. of water was added 0.01 mole of sodium p-(1-methyl-5-thia-n-undecyl) benzenesulfonate (Example VI) at 0° C. The mixture was stirred for 48 hours, filtered and the residue washed with ethanol. The filtrate and washings were concentrated, cooled and the precipitate collected to give the sulfoxide. The structure of the compound was elucidated by elemental analysis, infrared spectra and NMR.

*Elemental analysis.*—Calcd. (percent): C, 53.37; H, 7.11; S, 16.76. Found (percent): C, 53.32; H, 7.11; S, 16.70.

The tau value, intensities, and assignments of the NMR signals of the compound are as follows:

Aromatic _____ 2.20
H _____ 2.67
—CH— + —CH$_2$S(O)— _____ 7.17
—CH$_2$— and —CH—CH$_3$ _____ 8.75
—CH$_3$ _____ 9.14
Intensities _____ 2:2:5:15:3

The NMR spectrum shows an $A_2 B_2$ pattern for the phenyl protons indicative of a para-substituted benzene ring, with a coupling constant ($J_{AB}$) of 8 cps. The methine proton and methyl group adjacent to the sulfoxide group appears as a multiplet. The intensities found are as calculated.

The infrared spectrum shows an absorption band at 1030 cm.$^{-1}$ indicative of the sulfoxide group.

E

The isomers of p-(1-methyl-N-sulfonyl-n-undecyl) benzenesulfonates where N is 2–10 inclusive, are formed by reacting the appropriate p-(1-methyl-N-thia-n-undecyl) benzenesulfonate with ozone. The following example is illustrative of this synthesis.

EXAMPLE VIII

Sodium p-(1-methyl-5-sulfonyl-n-undecyl) benzenesulfonate.—To 0.1 mole of sodium p-(1-methyl-5-thia-n-undecyl) benzenesulfonate (Example VI) was added to 250 ml. of methylene chloride and 100 ml. methanol. The solution was placed in a flask equipped with a fritted cylindrical tube and ozone gas passed through the tube for 4 hours. The solvent was evaporated and the precipitate collected and recrystallized from ethanol-water to give sodium p-(1-methyl-5-sulfonyl-n-undecyl) benzenesulfonate.

*Elemental analysis.*—Calcd. (percent): C, 51.23; H, 6.83; S, 16.01. Found (percent): C, 51.00; H, 6.77; S, 16.01.

The tau value, intensity and assignment of the NMR signals are as follows:

Aromatic _____ 2.22
H _____ 2.62
—CH—+—CH$_2$SO$_2$— _____ 7.10
—SO$_2$CH$_3$+(—CH$_2$—) _____ 8.72
—CH$_3$— _____ 9.15
Intensities _____ 2:2:5:15:3

The NMR spectrum shows an $A_2 B_2$ pattern for the aromatic protons indicative of a para-substituted benzene ring with a coupling constant ($J_{AB}$) of 8 cps. The methine proton and the methylene group adjacent to the sulfone appear as a multiplet. The intensities found are as calculated.

The infrared spectrum shows absorption bands at 1310 and 1130 cm.$^{-1}$ indicative of the sulfone group.

The nuclear magnetic resonance spectra were recorded on a Varian 60 Mc spectrometer at 60° C. The samples to be tested were dissolved in deuterated water with sodium 2,2-dimethyl-2-silapentane-5-sulfonate (DDS) as internal standard (tau=10.00 for the trimethylsilyl protons). The infrared spectra were recorded on a Beckman IR9 spectrophotometer using KBr pellets.

Certain of the novel compounds of this invention possess a further advantageous property in that they are unexpectedly, highly biodegradable. Biodegradability in this context refers to the ability of a surfactant to be broken down in waste water by biological agents naturally present therein, for example, microbes. Since surfactants are undesirable contaminants when found in water supplies and adversely affect sewage and waste treatment processes because of their foaming and suspending action, it is of great importance that these compounds be rapidly and completely broken down.

Table V indicates the percent of surfactant biodegraded at different time intervals employing the River Die-Away Test wherein a 20 mg. sample of the surfactant is dissolved in ½ liter of river water and allowed to incubate at 25° C. The contents were mixed for one minute prior to sample withdrawal and the samples analyzed by the standard methylene blue method described by J. C. Vaughn in the J. Am. Water Works Assoc., 50, No. 10, 1343 (1958). The standard employed herein is the standard soft detergent of the Soap and Detergent Association and is a mixture of isomers of dodecyl benzenesulfonate (LAS) with approximately 80% of the isomers having the phenyl group attached to the 2 position of the alkyl chain and the remaining 20% consisting of other isomers.

Table VI indicates the percent of surfactant biodegraded at different time intervals using the Shake Flask Culture Procedure of the Soap and Detergent Association. A mixed microbial culture originating from activated sludge of a waste treatment plant was used for all shake flask degradation studies. The surfactant (20 g. per l.) was placed in a shake flask and sterilized in an autoclave at 20 p.s.i.g. for twenty minutes. After sterilization and cooling, the flask is innoculated with 10 ml. per liter of an adapted 72 hour mixed microbial culture. The innoculated surfactant solution was then incubated on a reciprocated shaker at 25° C. The standard employed is the same as that used in Table V.

TABLE V

Percent Biodegradation of the Surfactant in Passaic River Water

| Sample | 6 days | 12 days |
|---|---|---|
| (1) Standard (LAS) | 15 | 75 |
| (2) Sodium p(4,6-dithia-n-dodecyl) benzenesulfonate | 72 | 86 |
| (3) Sodium para-(1-sulfinyl-n-dodecyl) benzenesulfonate | 90 | 97 |
| (4) Sodium para-(2-sulfinyl-n-dodecyl) benzenesulfonate | 72 | 86 |
| (5) Sodium para-(3-sulfinyl-n-dodecyl) benzenesulfonate | 38 | 95 |
| (6) Sodium para-(5-sulfinyl-n-dodecyl) benzenesulfonate | 56 | 98 |
| (7) Sodium para-(11-sulfinyl-n-dodecyl) benzenesulfonate | 48 | 62 |
| (8) Sodium para-(1-sulfonyl-n-dodecyl) benzenesulfonate | 90 | 96 |
| (9) Sodium para-(2-sulfonyl-n-dodecyl) benzenesulfonate | 54 | 82 |
| (10) Sodium para-(3-sulfonyl-n-dodecyl) benzenesulfonate | 86 | 98 |
| (11) Sodium para-(4-sulfonate-n-dodecyl) benzenesulfonate | 98 | 99 |
| (12) Sodium para-(5-sulfonyl-n-dodecyl) benzenesulfonate | 74 | 92 |
| (13) Sodium para-(11-sulfonyl-n-dodecyl) benzenesulfonate | 30 | 58 |

TABLE VI

Percent Biodegradation of the Surfactant by the Shake Flask Culture Procedure of the Soap and Detergent Association

| Sample | 4 days | 6 days | 8 days |
|---|---|---|---|
| 1) Standard (LAS) | 82 | 96 | 98.3 |
| (2) Sodium p(4,6-dithia-n-dodecyl) benzenesulfonate | 94 | 98 | 99.6 |
| (3) Sodium para-(1-sulfinyl-n-dodecyl) benzenesulfonate | 98 | 100 | 100 |
| (4) Sodium para-(-sulfinyl-n-dodecyl) benzenesulfonate | 96 | 98 | 99.6 |
| (5) Sodium para-(3-sulfinyl-n-dodecyl) benzenesulfonate | 86 | 98 | 99.9 |
| (6) Sodium para-(4-sulfinyl-n-dodecyl) benzenesulfonate | 90 | 98 | 99.6 |
| (7) Sodium para-(5-sulfinyl-n-dodecyl) benzenesulfonate | 98 | 99 | 100 |
| (8) Sodium para-(11-sulfinyl-n-dodecyl) benzenesulfonate | 96 | 99 | 100 |
| (9) Sodium para-(1-sulfonyl-n-dodecyl) benzenesulfonate | 97 | 99 | 100 |
| (10) Sodium para-(2-sulfonyl-n-dodecyl) benzenesulfonate | 92 | 96 | 98 |
| (11) Sodium para-(3-sulfonyl-n-dodecyl) benzenesulfonate | 96 | 97 | 97.9 |
| (12) Sodium para-(4-sulfonyl-n-dodecyl) benzenesulfonate | 97 | 99 | 100 |
| (13) Sodium para-(5-sulfonyl-n-dodecyl) benzenesulfonate | 99 | 99 | 100 |

We claim:
1. A compound of the formula:

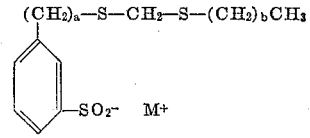

wherein M is a cation selected from the group consisting of alkali metals, alkaline earth metals, ammonium and alkanolamines and wherein $a$ is a whole integer from 1 to 8 and $b$ is a whole integer from 0 to 7 with the sum of $a$ and $b$ being 8.

2. A compound according to claim 1 wherein $a$ is 3 and $b$ 5.

3. A compound according to claim 2 wherein M is sodium.

References Cited

UNITED STATES PATENTS

| 2,404,927 | 7/1946 | Schmerling, et al. | 260—663 |
|---|---|---|---|
| 2,821,549 | 1/1958 | Mock | 260—505 |
| 3,006,962 | 10/1961 | Schultz et al. | |
| 3,050,440 | 8/1962 | Richter. | |
| 3,060,190 | 10/1962 | Collins et al. | |
| 3,118,002 | 1/1964 | Penzing. | |
| 3,275,667 | 9/1966 | Bohunek. | |
| 3,344,173 | 9/1967 | Long et al. | 260—505 |

OTHER REFERENCES

Boundy et al. "Styrene, Its Polymers and Derivatives," 1952, pp. 94–96.

LEON ZITVER, Primary Examiner

J. E. EVANS, Assistant Examiner

U.S. Cl. X.R.

260—501.19; 252—161